United States Patent [19]
Schmitt

[11] 3,985,607
[45] Oct. 12, 1976

[54] APPARATUS FOR REMOVING CONTAMINENTS FROM COCOA AND COCOA BUTTER MASSES

[75] Inventor: Armin Schmitt, Birkeneck, Germany

[73] Assignee: J. S. Petzholdt, Germany

[22] Filed: Mar. 18, 1974

[21] Appl. No.: 451,880

[30] Foreign Application Priority Data
Mar. 19, 1973 Germany.............................. 2313563

[52] U.S. Cl................................. 159/6 W; 259/4 R
[51] Int. Cl.²........................ B01D 1/22; B01F 15/00
[58] Field of Search ........... 259/4, 18, 36; 159/6 W, 159/6 WH, 2 E; 165/136, 179, 174

[56] References Cited
UNITED STATES PATENTS

| | | | |
|---|---|---|---|
| 2,941,985 | 6/1966 | Amos et al..................... | 159/DIG. 10 |
| 2,993,842 | 7/1961 | Smith............................... | 159/6 W |
| 3,320,220 | 5/1967 | Drusco et al...................... | 159/48 L |
| 3,334,680 | 8/1967 | McManus .......................... | 159/6 W |
| 3,506,245 | 4/1970 | Noschinski et al................ | 159/6 W |
| 3,770,249 | 11/1973 | Schmitt................................ | 259/4 |

FOREIGN PATENTS OR APPLICATIONS
345,279  3/1931  United Kingdom................ 165/179

*Primary Examiner*—Jack Sofer
*Attorney, Agent, or Firm*—Bauer, Amer & King

[57] ABSTRACT

The apparatus and method for removing undesirable flavors and odors from cocoa and cocoa butter wherein sufficient water is added to the cocoa mass to permit emulsifying same into a flowable condition, forming the emulsion into a thin layer and passing heated air through the mass to remove the undesirable constituents.

The aforementioned Abstract is neither intended to define the invention of the application which, of course, is measured by the claims, nor is it intended to be limiting as to the scope of the invention in any way.

1 Claim, 5 Drawing Figures

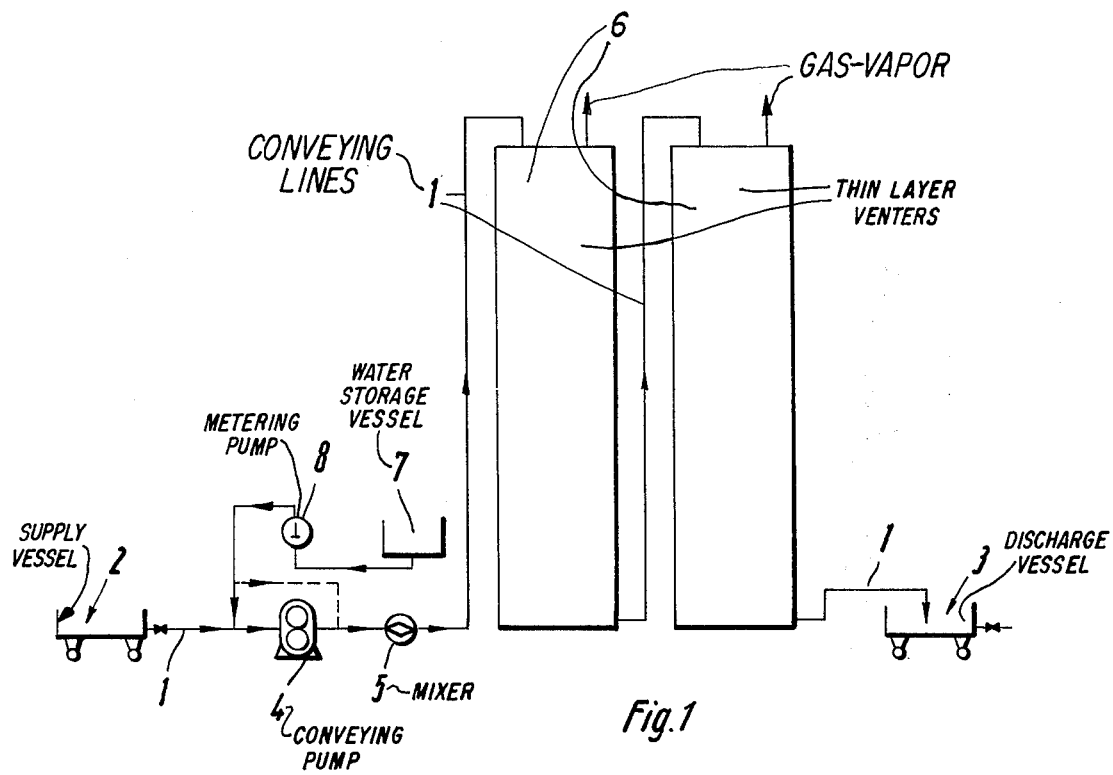
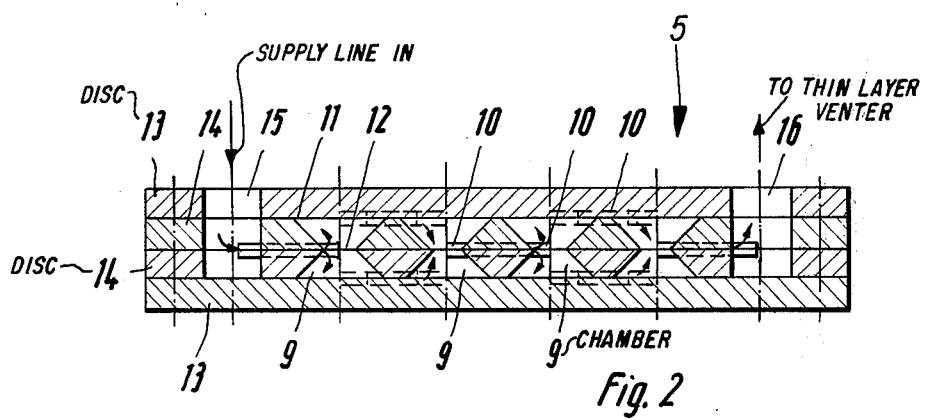

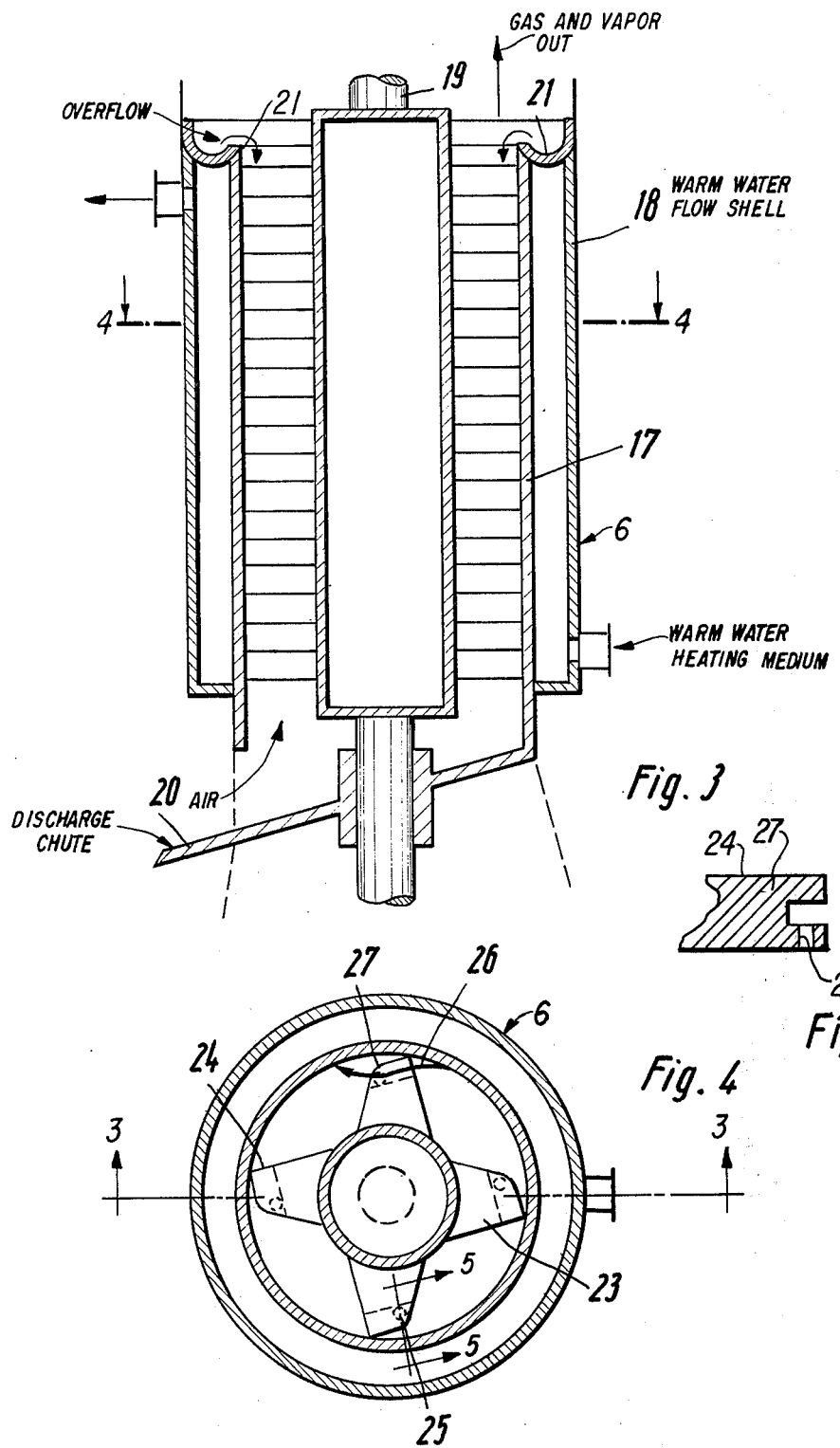

APPARATUS FOR REMOVING CONTAMINENTS FROM COCOA AND COCOA BUTTER MASSES

This invention relates to a method and an apparatus for the removal of flavors, odorants and the like from cocoa or cocoa butter masses.

Upon roasting cocoa, in addition to the desired flavor development, simultaneously undesired taste and flavor constituents result. The undesired taste and flavor must be removed by appropriate means and methods to achieve a product, such as chocolate mass and cocoa butter, of high quality in its flavor.

Conventional methods of this nature for the production of chocolate are the so-called tumbling treatment in a conche and the so-called desodoration for the production of cocoa butter.

The percentage water content of the cocoa mass now is of decisive significance both for the roasting process and for the subsequent treatment phases for the flavor development. While in the roasting process the water content of the cocoa mass is to not exceed a predetermined percentage — in order to avoid the formation of undesired flavor constituents, in the subsequent treatment stages a higher water content of the roasted cocoa mass is desired so to serve as a carrier for expelling the undesired taste and flavor constituents.

On the other hand, an excessive water content of the cocoa mass is accompanied by a high increase of viscosity rendering difficult the subsequent treatment stages (mixing, rolling and tumbling treatment in a conche) to the effect that the energy absorption increases overproportional and the pass rate or the charge period respectively are affected negatively to a great extent.

Although it is known by tests and the roasting process that flavors may be removed with the water and an according treatment (roasting, venting), in the first place, namely to the extent that the desired cocoa flavor also looses its intensity so that in practice no attempts have as yet been made to deliberately add water after roasting, presumably because it was apprehended that the further energy requirements would be inappropriately increased, and because attempts had failed to dispense the water in the mass by a simple agitation or mixing.

An object of the invention accordingly is to provide a method and an apparatus in order to permit the removal of such harmful flavors by means of water and in order to thereby be able to reduce the subsequent treatment stages, in particular the tumbling treatment in a conche of chocolate masses, and thus also the duration thereof regarding the energy requirements.

The method for the cited purpose according to this invention features in the steps that additional water is added to the mass maintained in a flowable condition and continuously conveyed, in a continuous fashion, and this addition water is emulsified with the mass during further conveying thereof, the emulsified mass thereafter being spread in a thin layer and being degassed in constantly lifting the mass from the layer and refluxing thereof in the layer, by venting or under vacuum.

The decisive feature thus is the admixture of addition water into the continuously further conveyed mass, the fine dispersion of the water by emulsifying during transportation, and the dispension of the emulsified mass in a thin layer, the addition water then being expelled with the harmful flavors by an intensive venting or by applying a vacuum, in particular for the processing of cocoa butter.

Actually, no precise limits may be specified for the quantity of the water to be added. In view of the increase of viscosity dependent on the water addition, the energy requirement thereby afforded for the mass movements, and the subsequent expelling of the water from the mass addition quantities in the order of about 0.5 to 1.5 % related to the total pass quantity have been found to be suitable.

Tests have shown that cocoa masses treated with the method of this invention bring about a marked mildening of the acrid-harsh flavor and a higher degree of the cocoa-typical flavor, as compared with a non-treated cocoa mass.

It has also been found in these tests that for instance a renewed water addition in the same order to a mass already treated in the same way so to say results in a passing of the flavor optimum, i.e. such a treatment already causes an extensive flavor degrading.

The use of the specified method steps with a continuous conveying of the mass is of substantial significance because the addition of water in a discontinuous operation requires an incomparatively longer period of time for the fine dispension of the water in the mass, this extended period of time then favoring the actually undesired swelling process occurring in conjunction with an increase in viscosity. The advantage of the water addition continuous with the continuous mass transportation, said water addition being able to be called more an inoculation in view of the relatively low amount of water, is that (naturally in continuum) minute amounts of water are always added to minor amounts of mass, thereby minor amounts directly getting in the emulsifying phase and being able to pass it with an optimum effect so to say with a strict flow control.

For the individual method steps apparatus known per se are available, conventional mixers and for instance thin-layer evaporators readily being able to be adopted for a continuous operation in the sense of the method of this invention, in a cooperative basis.

Preferably, however, a so-called static mixer according to the German patent application 2,130,134 for the emulsiying operation and an apparatus according to the German patent specification 1,557,184 for the degassing phase are employed.

The apparatus or the mixer according to the German patent specification 2,130,134 on the one hand is provided for a continuous pass anyhow, and on the other hand it results in an excellent fine dispersion of the water addition in the cocoa mass, and the apparatus according to the German patent specification 1,557,184 likewise operates in a continuous pass in a thin layer, the specific configuration of the treatment elements causing a constant mass lifting from the layer and a repelling of the mass onto the layer support surface, so that thus very good conditions are provided for an intensive degassing either by venting or by applying a vacuum (in particular in the according treatment of cocoa butter).

Heated air is fed to the cocoa mass in this apparatus through the hollow rotor, into the annular space between the stator and the rotor, the air turbulently passing the mass particles from the bottom to the top in a countercurrent flow and being passed off bearing the harmful flavors and humidity.

In the treatment of cocoa butter, on the other hand, the interior of the apparatus is subjected to a vacuum in order to render more intensive the evaporating process of the water. The applying of a vacuum is recommended in this case because the treatment atmosphere for cocoa butter is to be free of oxygen, if possible, in order to avoid undesired changes of the fat.

The apparatus for practising the method according to the invention features the combination of the features known per se:

a. a conveying line for the continuous passage of the mass from the supply to the discharge vessel;

b. a conveying pump installed in the conveying line;

c. an in-line mixer installed in the conveying line downstream of the conveying pump;

d. at least one venter or evaporator installed in the conveying line downstream of the in-line mixer, for the thin layer, said venter or evaporator being ventable or evacuatable; and e. a metering pump in communication with a water storage vessel, said metering pump at the metering side being in communication with the conveying line upstream or downstream of the conveying pump.

The in-line mixer in this regard is preferably formed of a plurality of individual chambers arranged in series in direction of flow, said chambers being connected to one another by supply and discharge channels, the individual chambers having the form of a double truncated cone and the connecting channels being provided tangentially porting into and out of the individual chambers, respectively, in such a way that in direction of flow alternatingly adjacent individual chambers on the one hand are connected to one another in the region of their largest cross-sections and then on the other hand in the region of their smallest cross-sections, and preferably the thin-layer evaporator is formed of a vertically arranged pipe with mass supply and mass discharge, a rotatable shaft having centrifugal elements in a multi-level arrangement being provided coaxially in the pipe, said shaft confining with the inner walls of the pipe a cylindrical annular space for the passage of the masse from the top to the bottom and causing the centrifugalizing of the mass in the form of a veil against the pipe walls, the centrifugal and peeling elements having peeling mouth pieces which are in communication with spray openings through channels, said spray openings having a lesser spacing from the shaft or pipe axis in relationship to the peeling mouth pieces.

For these specific embodiments known per se protection is claimed only within the scope of the invention.

The method of this invention and the apparatus for practising it are explained in closer detail hereinafter in referring to the illustrations in the drawings showing certain embodiments.

In these illustrations,

FIG. 1 shows diagrammatically the individual apparatus elements in their association to the conveying line;

FIG. 2 is a cross-sectional view of the mixer preferably used;

FIG. 3 a diagrammatic cross-section view of the thin-layer evaporator preferably used;

FIG. 4 is a horizontal cross-section view of the thin-layer evaporator taken along line 4—4 of FIG. 3; and FIG. 5 is a horizontal cross-section view taken along line 5—5 of FIG. 4.

FIG. 1 illustrates diagrammatically the precise spatial arrangement of the individual elements of the apparatus in relationship to one another, 1 denominating the conveying line, 2 the supply vessel, 3 the discharge vessel, 4 the conveying pump, 5 the mixer, 6 the thin-layer venter, 7 the water storage vessel, and 8 the metering pump.

The conveying directions of the mass and the water are indicated by arrows. The dashed line going into the line 1 downstream of the conveying pump 4 merely indicates that the metered addition of the water may also be effected downstream of the conveying pump 4.

The supply and discharge vessels 2, 3 respectively are formed as movable mass containers capable of being connected to the conveying line. The metering and the conveying pump require no specific description, since for these commercially available pumps may readily be used. The mixer 5 to be preferably used requires no motor drive, since the mass conveyed by the pump 4 is pressed through this static mixer. Such a mixer 5 has been illustrated in a cross-sectional view in FIG. 2, and although it is known per se, it is briefly described for the sake of completeness.

In FIG. 2 the reference numeral 9 denominates the individual chambers, 10 the connecting lines, 11 and 12 the maximum and minimum cross-sections, respectively, of the mixing chambers, and 13 the terminal disc for the individual discs 14, into which the truncated cones have been cut as halves of the individual chambers and the connecting lines 10. The discs 13, 14, stacked together and accordingly clamped together, form the housing to which through supply lines 15 the mix is supplied under pressure and which it leaves again after passing through the individual chambers 9, through the discharge line 16. In FIG. 2 the individual chambers are arranged in series, the mix initially flowing into the chamber in the region of the minimum cross-section and leaving it again in the region of maximum cross-section and going to the next individual chamber in the region of the maximum cross-section which it then leaves in the region of the minimum cross-section.

For the sake of completeness, the thin-layer venter according to FIGS. 3 and 4 is also briefly described.

According to FIG. 3, the apparatus comprises a pipe 17 which may be encased by a warm water flow shell 18, and a solid shaft 19 concentrically associated to the pipe, which shaft in this embodiment is formed as a hollow shaft in the actual functional region. In the lower region, the pipe merges in to discharge chute 20 for the mass treated.

The drive elements for the shaft 19 may be housed in the machine base. The liquid mass is passed through a supply for instance into an overflow chute from which it passes through the overflow edge as a film onto the inner walls of the pipe 17 in case a sufficient quantity of mass is supplied.

Peeling and centrifuging elements 23 constantly pass along this inner wall with a relatively high speed, said elements 23 being circumferentially spaced around the hollow shaft and axially and vertically juxtaposed along the entire length of the shaft at levels above each other. These peeling and centrifuged elements 23 on the one hand have a peeling mouth piece 24 at their front surface and on the other hand in their lower horizontal confining surface spray openings 25 which are slightly offset radially inwardly relative to the outer edge of the peeling mouth piece. The result of this configuration is that the mass flowing downwardly as a film along the inner walls of the pipe is received by the peeling mouth pieces and is urged to the downwardly directed spray opening in the sense of the arrow 26 through the channel 27 by virtue of the pressure head occurring and is centrifuged against the inner walls of the pipe again from there, the mass particles taking a generally spiral course until they strike the walls. By this process, the mass thus is constantly lifted off the inner walls of the pipe and centrifuged against the inner walls of the pipe again at a somewhat lower level, and this is associated with a constant intermixing, dispension and relayering of the mass, but also with an intensive venting, since air is constantly drawn or pressed through the cylindrical annular space between elements 17 and 19.

This apparatus is respectively arranged to be vented by the arrangement of a suction hood including a blower, or if it is accordingly sealed as a vacuum chamber, a closure has to be provided for the mass discharge.

Hereinafter, results of comparison tests conducted are set forth, test A having been conducted alone with the thin-layer venter 6 without any additional water addition, while in test B water was added and emulsified with the mass by means of the mixer 5.

A cocoa mass consisting of a mixture of three different cocoa types, conventionally roasted and milled to between 70 to 90 microns was employed as the starting product.

The following was tested:

A. Effect of retention time (single or multiple pass through the thin-layer venter 6);

B. Effect of the artificial water enrichment of the cocoa mass prior to entering the thin-layer venter 6 on the substance and sensory properties of the cocoa mass.

Tests were conducted in both test series (A and B) with a throughflow of 660 kgs/h and a mean temperature of the mass of about 80° C; the entering temperature of the mass in the thin-layer venter was about 65° C. The mean retention time per single passage through the thin-layer venter was about 2 min.

Test

A. The same cocoa mass was passed through the thin-layer venter three times in a sequence, and the following results were recorded:

Water content of the starting mass = 1.51 % by weight;

Change of the water content in % by weight of the starting value after the first passage from 1.51 to 0.63 = 58.2%;

after the second passage from 0.63 to 0.47 = 6.9%;

after the third passage from 0.47 to 0.38 = 5.95%;

The reduction of the readily volatile substances changed somewhat in the same percentage relationship as the water reduction did.

Sensory Judgement

The inferior odor and flavor substances were reduced most after the first passage through the thin-layer venter, the typical cocoa flavor occurring more marked.

With the second passage, aromatic, cocoa typical flavor profile was achieved.

The third passage on the other hand already brought about a strong flavor degrading of the cocoa mass. The second passage thus furnished the optimum result in flavor aspects under the conditions given.

Test

Test B. 1. The same starting mass as set forth under A) was enriched through the static mixer by about 0.5% $H_2O$ (from 1.51% to 2.0%) and was fed into the thin-layer venter.

Result

Variation of the water content in % by weight of the starting value from 2.0 to 0.49 = 75.5%.

2. The same starting mass as under A) was enriched like above by about 1.0% $H_2O$ (from 1.51 to 2.5%) and fed into the thin-layer venter.

Result

Variation of the water content in % by weight of the starting value from 2.5 to 1.16 = 53.6%

Sensory Judgement

The inferior odor and flavor substances were strongly reduced in both treatments (B1 and B2).

The sensory finding indicated in test B1 a significant mellowing of the harsh acrid flavor and an enhancing of the cocoa typical flavor. In test B2 on the other hand, the flavor optimum had already been slightly exceeded.

A water addition of $> 0.5 < 1\%$ accordingly is generally equivalent to the treatment according to the passage 2 of test A, regarding the flavor improvement.

Referred to practise, this means that when processing according to test B twice the capacity is available in relationship to the processing according to test A (two passages) and only half the installation cost accrue, respectively. Since the entire installed energy in both cases (A and B) is of the same order per passage, the energy cost is reduced to the half generally in case B.

I claim:

1. An apparatus for removing of harmful flavors, odorants or the like from cocoa or cocoa butter masses comprising:

a. a conveying line for the continuous passage of the mass from a supply source to a discharge vessel;

b. a conveying pump positioned in said conveying line;

c. an in-line mixer positioned in said conveying line, said mixer comprising:

a plurality of individual chambers arranged in a series in direction of flow, said individual chambers being connected to one another by supply and discharge channels, the individual chambers having the form of a double truncated cone with their small bases in coaxial contact and the connecting channels being arranged opening tangentially into and from the individual chambers, respectively, in such a way that in direction of flow, alternatively adjacent individual chambers on the one hand are connected to one another in the region of their maximum and in the region of the minimum cross-sections;

d. a gas and vapor venting means comprising:

a vertically standing pipe having a mass supply and discharge openings at the top and bottom, respectively, a rotatable shaft having centrifuging elements affixed thereto in a multi-level arrangement being coaxially provided in said pipe, said elements conforming with the inner walls of the pipe and occupying a cylindrical annular space for the passage of the mass from the top to the bottom and for centrifuging said mass in the form of a film against the pipe walls, centrifuging and peeling elements having peeling mouths facing in the direction of rotation and which are in communication with downwardly directed spray openings via imbedded channels, said spray openings having a lesser spacing from the shaft or pipe axis in relationship to the peeling mouth pieces; said elements (b), (c) and (d) being arranged in series in said conveying line in the order named; and e. a metering pump in communication with a source of water and arranged to introduce water to said conveying line.

* * * * *